US012617893B2

(12) United States Patent
Howell, Jr. et al.

(10) Patent No.: US 12,617,893 B2
(45) Date of Patent: May 5, 2026

(54) METHOD FOR MANUFACTURE OF POLYESTERS WITH RECYCLE CONTENT

(71) Applicant: Eastman Chemical Company, Kingsport, TN (US)

(72) Inventors: Earl Edmondson Howell, Jr., Cookeville, TN (US); Michael Paul Ekart, Kingsport, TN (US); Travis Wynn Keever, Jonesborough, TN (US); Bob N. Jack, Kingsport, TN (US); Jonathan Michael Horton, Kingsport, TN (US); Daniel Lee Martin, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 729 days.

(21) Appl. No.: 17/757,392

(22) PCT Filed: Dec. 16, 2020

(86) PCT No.: PCT/US2020/065256
§ 371 (c)(1),
(2) Date: Jun. 15, 2022

(87) PCT Pub. No.: WO2021/126938
PCT Pub. Date: Jun. 24, 2021

(65) Prior Publication Data
US 2023/0026172 A1 Jan. 26, 2023

Related U.S. Application Data

(60) Provisional application No. 62/950,619, filed on Dec. 19, 2019.

(51) Int. Cl.
| | |
|---|---|
| *C08J 11/08* | (2006.01) |
| *C08G 63/183* | (2006.01) |
| *C08G 63/86* | (2006.01) |
| *C08J 11/24* | (2006.01) |

(52) U.S. Cl.
CPC ......... *C08G 63/183* (2013.01); *C08G 63/866* (2013.01); *C08J 11/24* (2013.01); *C08J 2367/03* (2013.01)

(58) Field of Classification Search
USPC ........................................................ 521/48
See application file for complete search history.

(56) References Cited

U.S. PATENT DOCUMENTS

| | | | |
|---|---|---|---|
| 3,037,050 A | 5/1962 | Heisenberg |
| 3,321,510 A | 5/1967 | Lotz et al. |
| 3,776,945 A | 12/1973 | Ligorati et al. |
| 5,051,528 A | 9/1991 | Naujokas et al. |
| 5,290,631 A | 3/1994 | Fleury et al. |
| 5,298,530 A | 3/1994 | Gamble et al. |
| 5,414,022 A | 5/1995 | Toot, Jr. et al. |
| 5,432,203 A | 7/1995 | DeBruin et al. |
| 5,576,456 A | 11/1996 | Gamble et al. |
| 6,262,294 B1 | 7/2001 | Sako et al. |
| 2004/0054019 A1 | 3/2004 | Ishihara et al. |
| 2009/0275698 A1 | 11/2009 | Ravi et al. |
| 2013/0041053 A1 | 2/2013 | Pecorini et al. |

FOREIGN PATENT DOCUMENTS

| | | | |
|---|---|---|---|
| DE | 102020203563 A1 | 9/2021 | |
| EP | 1023369 A1 * | 8/2000 ............. C07C 67/03 |
| EP | 1023369 B1 | 1/2002 | |
| JP | H10310637 A | 11/1998 | |
| JP | 3888884 B2 | 3/2007 | |
| WO | WO 99 20684 A1 | 4/1999 | |
| WO | WO 2013 130174 A1 | 9/2013 | |
| WO | WO 2021 211506 A1 | 10/2021 | |

OTHER PUBLICATIONS

Co-pending U.S. Appl. No. 18/727,551, filed Jul. 9, 2024; Ekart and DeBruin.
Co-pending U.S. Appl. No. 18/727,559, filed Jul. 9, 2024; Ekart and DeBruin.
Notification of Transmittal of the International Search Report and the Written Opinion of the International Searching Authority, or the Declaration date of mailing Apr. 9, 2021 received in International Application No. PCT/US2020/065256.
Notification of Transmittal of the International Search Report and the Written Opinion of the International Searching Authority, or the Declaration date of mailing Apr. 24, 2023 received in International Application No. PCT/US2023/060455.
Notification of Transmittal of the International Search Report and the Written Opinion of the International Searching Authority, or the Declaration date of mailing Apr. 13, 2023 received in International Application No. PCT/US2023/060466.
Provision by Third Party of Information received in JP Application No. 2022-537354 submitted on Feb. 4, 2025 (machine translation).

* cited by examiner

*Primary Examiner* — Terressa Boykin
(74) *Attorney, Agent, or Firm* — Tammye L. Taylor Polk

(57) ABSTRACT

A method for the manufacture of polyesters with recycle content by feeding to at least one reaction zone recycle feed comprising an ester recycle material selected from the group consisting of r-DMT, transesterified r-DMT and combinations thereof to form a reaction mixture comprising recycled content in at least one reaction zone; reacting the reaction mixture to form a polyester oligomer mixture with recycled content; and polycondensing the recycle content oligomer mixture to form a polyester with recycle content; wherein the feeding step further comprises feeding to at least one reaction zone a virgin feed, the virgin feed including at least one virgin diol component, the virgin feed further comprises a virgin diacid component, and the virgin diacid component is at least 90 mole % terephthalic acid based on the total diacid content of the virgin feed; and wherein the reacting step comprises reacting the reaction mixture at a temperature of at least 250° C. for a total average residence time of between 30 minutes and 12 hours.

15 Claims, No Drawings

METHOD FOR MANUFACTURE OF POLYESTERS WITH RECYCLE CONTENT

CROSS-REFERENCE TO RELATED APPLICATION(S)

This application is a national stage filing under 35 USC § 371 of International Application Number PCT/US2020/065256, filed on Dec. 16, 2020 which claims the benefit of the filing date to U.S. Provisional Application No. 62/950,619, filed on Dec. 19, 2019, the entire disclosures of which are incorporated by reference herein.

FIELD OF THE INVENTION

The present disclosure generally relates to the fields of polyester recycle and polyester manufacture and more particularly to polyester manufacturing processes that include use of the methanolysis reaction products in forming polyesters with recycle content.

BACKGROUND OF THE INVENTION

Polyesters are one of the world's most purchased and diversely utilized class of polymers, with published world production volumes (including recycling) recently reported to be well in excess of 75 million tons. This level of commercial success is likely attributable in part to polyesters' attractive combination of relative cost, manufacturability and competitive performance attributes. Polyester's physical, chemical and thermal properties make them useful and desirable for a wide variety of end-use applications. Polyethylene terephthalate (PET) is one of the most popular types of polyester for many end-uses. With the continuing commercial success of polyesters generally and PET specifically have come efforts to recover materials from post-consumer, post-industrial, scrap and other sources and re-use those materials as an alternative to basic disposal methods such as landfills.

In one known recycle method, recycled PET is blended with virgin materials. This approach has been used, for example, to prepare blends of virgin poly(butylene terephthalate) ("PBT") with recycled PET to yield a PBT-based product with recycle content (see, for example, U.S. Patent Published Patent Application No. 2009/0275698). Such blends, however, can be generally immiscible and produce a material that is relatively opaque. Blending, therefore, is not a uniformly satisfactory method to provide commercially valuable end products with recycle content.

In another recycle method, polyesters are depolymerized to form the monomer units originally used in its manufacture. One commercially utilized method for polyester depolymerization is methanolysis. In methanolysis, the polyester is reacted with methanol to produce a depolymerized polyester mixture comprising polyester oligomers, dimethyl terephthalate ("DMT"), and ethylene glycol ("EG"). Other monomers such as, for example, 1,4-cyclohexanedimethanol ("CHDM") and diethylene glycol may also be produced depending on the composition of the polyester in the methanolysis feed stream. Some representative methods for the methanolysis of PET are described in U.S. Pat. Nos. 3,037,050; 3,321,510; 3,776,945; 5,051,528; 5,298,530; 5,414,022; 5,432,203; 5,576,456 and 6,262,294, the contents and disclosure of which are each incorporated herein by reference. A representative methanolysis process is also illustrated in U.S. Pat. No. 5,298,530, the contents and disclosure of which are incorporated herein by reference. The '530 patent describes a process for the recovery of ethylene glycol and dimethyl terephthalate from scrap polyester. The process includes the steps of dissolving scrap polyester in oligomers of ethylene glycol (EG) and terephthalic acid (TPA) or dimethyl terephthalate (DMT) and passing superheated methanol through this mixture. The oligomers can comprise any low molecular weight polyester polymer of the same composition as that of the scrap material being employed as the starting component such that the scrap polymer will dissolve in the low molecular weight oligomer. The dimethyl terephthalate and the ethylene glycol are recovered from the methanol vapor stream that issues from depolymerization reactor.

Uses of the monomer units generated via depolymerization, in particular DMT and EG, are continuously being investigated by manufacturers with a goal of producing and selling new materials with recycled content. For example, the assignee of the present disclosure generally proposes in U.S. Published Patent Application No. 2013/0041053 that recycled monomers such as DMT can be combined with virgin monomers in polyester manufacture. The proposal, however, has its drawbacks. First, it contemplates operation of the esterification/transesterification step at temperatures, typically, about 150° C. to about 250° C. for about 0.5 to about 8 hours and at pressures ranging from about 0.0 kPa gauge to about 414 kPa gauge (60 pounds per square inch, psig). Such conditions are not aligned with operational conditions suitable for current-day terephthalic-acid-based (TPA-based) polyester manufacturing processes in which the feed is substantially devoid of purposefully added esters and includes only diacids, predominantly terephthalic acid, and one or more glycols. Achieving recycle content by incorporation of recycles materials such as recycle DMT (r-DMT) and/or recycle ethylene glycol (r-EG) into current TPA-based processes would therefore not seem feasible without manipulation and possible disruption of process settings and related product uniformity and yields. Further, the '053 published application notes that, when using a mixed acid/ester feed, a 3-stage manufacturing procedure as described in U.S. Pat. No. 5,290,631 should be employed. Additional process steps bring with them additional capital, manufacturing and labor costs.

A continuing unmet need therefore exists for a method to produce polyesters with recycle content by effectively and cost-efficiently incorporating recycled materials such recycle DMT (r-DMT) and recycle ethylene glycol (r-EG) into existing TPA-based polyester manufacturing systems.

SUMMARY OF THE INVENTION

In a first aspect, the present disclosure relates to a method for manufacture of polyesters with recycle content wherein the method includes the steps of feeding to at least one reaction zone recycle feed comprising an ester recycle material selected from the group consisting of r-DMT, transesterified r-DMT and combinations thereof to form a reaction mixture comprising recycled content in the at least one reaction zone; reacting the reaction mixture to form a polyester oligomer mixture with recycled content; and polycondensing the recycle content oligomer mixture to form a polyester with recycle content.

In another aspect, the present disclosure relates to a recycle feed composition for manufacture of polyesters with recycle content. The recycle feed composition of the present disclosure includes ester recycle material selected from the group consisting of r-DMT, transesterified r-DMT and combinations thereof; and at least one of dimethyl isophthalate recycle material (r-DMI) and residual catalyst material selected from the group consisting of germanium materials and antimony materials and combinations thereof.

In yet another aspect, the present disclosure relates to polyesters with recycle content.

Further aspects of this disclosure are as disclosed and claimed herein.

DETAILED DESCRIPTION

The term "polyester" as used herein is meant to generally include without limitation homopolyesters as well as copolyesters, terpolyesters and the like and are typically prepared in the general sense by reacting a diacid, its ester or mixtures of such acids or esters, with a difunctional hydroxyl compound, often a diol or glycol, or mixtures of such diols or glycols. Alternatively, the difunctional carboxylic acid may be a hydroxy carboxylic acid and the difunctional hydroxyl compound may be an aromatic nucleus bearing 2 hydroxyl substituents such as, for example, hydroquinone. Of particular interest regarding the present disclosure as described herein are polyesters which, via depolymerization by methanolysis or glycolysis with subsequent methanolysis of the reaction product, methanolysis, generate one or both of dimethyl terephthalate and ethylene glycol.

In a first aspect, the present disclosure is directed to a method for manufacture of polyesters with recycle content. The method of the present disclosure includes the steps of feeding to at least one reaction zone recycle feed comprising an ester recycle material selected from the group consisting of r-DMT, transesterified r-DMT and combinations thereof to form a reaction mixture comprising recycled content in the at least one reaction zone; reacting the reaction mixture to form a polyester oligomer mixture with recycled content; and polycondensing the recycle content oligomer mixture to form a polyester with recycle content.

In one or more embodiments, the reacting step comprises reacting the reaction mixture at a temperature of at least 250° C. for a total average residence time of between 30 minutes and 12 hours or between 1 hour and 10 hours or between 1 hour and 8 hours. In one or more embodiments, the reacting step includes reacting the reaction mixture at a temperature of from 250° C. to 350° C. or from 250° C. to 300° C. or from 260° C. to 300° C. or from 250° C. to 275° C.

As noted above, polyesters may be prepared in the general sense by reacting a diacid, its ester or mixtures of such acids or esters, with a difunctional hydroxyl compound, often a diol or glycol, or mixtures of such diols or glycols. One of ordinary skill will appreciate therefore that, in order to form the polyesters with recycled content of the present disclosure, the reaction mixture in the at least one reaction zone includes components known in the art for forming polyesters, for example (i) a diacid, its ester or mixtures of such acids or esters and (ii) a difunctional hydroxyl compound such as a diol or glycol, or mixtures of such diols or glycols. In one or more embodiments, the reaction mixture includes recycle components. In one or more embodiments, the reaction mixture includes recycle components and virgin components. As utilized herein, the term "recycle" is intended to mean sourced through recycling of, for example, scrap, off-spec, waste, post-consumer or post-industrial materials. As utilized herein, the term "virgin" is intended to mean manufactured from raw materials such as fossil fuel-based or bio-based raw materials as opposed to sourced through recycling of, for example, scrap, off-spec, waste, post-consumer or post-industrial materials.

In one or more embodiments, the feeding step of the method of the present disclosure further includes feeding to at least one reaction zone a diol recycle material selected from the group consisting of r-EG, recycle diethylene glycol (r-DEG) and combinations thereof.

In one or more embodiments, the recycle feed further includes dimethyl isophthalate recycle material (r-DMI). In one or more embodiments, the r-DMI is present in the recycle feed in an amount of 2000 ppm or more or 1500 ppm or more or 1000 ppm or more or 500 ppm or more. In one or more embodiments, the recycle feed may further include terephthalic acid recycle material (r-TPA), which may include r-TPA formed via hydrolysis of r-DMT. In one or more embodiments, the method of the present may include hydrolyzing at least some r-DMT to form r-TPA prior to the reacting step.

In one or more embodiments, the recycle feed further includes a residual catalyst material. Residual catalyst material may be one or more materials or compounds present in the recycle feed whose source is the original polyester that is subjected to depolymerization to form r-DMT. In one or more embodiments, residual catalyst material may be selected from the group consisting of germanium materials and antimony materials and combinations thereof. In one or more embodiments, the antimony material is present in the recycle feed in an amount of 5 to 500 ppm or 10 to 500 ppm or 20 to 500 ppm or 5 or more ppm. In one or more embodiments, the germanium material is present in the recycle feed in an amount of 5 to 500 ppm or 10 to 500 ppm or 20 to 500 ppm or 5 or more ppm.

In one or more embodiments, the recycle feed further includes dimethyl isophthalate recycle material (r-DMI) and a residual catalyst material selected from the group consisting of germanium materials and antimony materials and combinations thereof.

In one or more embodiments, the, feeding step of the method of the present disclosure further includes feeding a virgin feed to the at least one reaction zone. In one or more embodiments, the at least one diol of the virgin feed a virgin diol. The virgin feed may include one or more other virgin materials such as for example virgin diacids, virgin diesters, virgin branching agents such as for example trimellitic anhydride and the like.

In one or more embodiments, the virgin feed is substantially devoid of virgin diester components. In one or more embodiments, said virgin feed is substantially devoid of virgin diacid components. Accordingly, in one or more embodiments, the reaction mixture may include virgin diol components, or may be substantially devoid of virgin diacid components, or may be substantially devoid of virgin diester components. As used here, the phrase "substantially devoid" is generally intended to mean that the virgin feed does not include any purposefully added virgin acid and/or ester content. One of ordinary skill will appreciate, however, that incidental diacid/diol reaction in the virgin feed may result in formation of minor amounts of virgin diester compounds. Accordingly, in one or more embodiments, the phrase "substantially devoid" in describing the virgin diester content of the virgin feed is intended to mean that the virgin feed includes no more than 5 mole % or no more than 4 mole % or no more than 3 mole % or no more than 2 mole % or no more than 1 mole % of virgin diester compounds based on the sum total moles of diacid+moles diester in the virgin feed. In one or more embodiments, the reaction mixture may include at least 95% or at least 96% or at least 97% or at least 98% or at least 99% or 100% by weight recycle feed based on the total weight of the reaction mixture.

In one or more embodiments of this aspect, the step of feeding virgin feed to the reaction zone the step of feeding the virgin feed precedes said step of feeding the recycle feed. In one or embodiments of this aspect, the method further includes the step of reacting at least some of the virgin feed in the reaction zone to form virgin polyester oligomer prior to or concurrent with the step of feeding the recycle feed.

In one or more embodiments, the ester recycle material of the feeding step is added in an amount sufficient to account for 1 to 100 mole % or 25% to 100% or 90% to 100% or 1% to 50% or based on the total moles diacid of 1,4-dicarboxy-benzene equivalents in the polyester with recycled content. It will be appreciated that the relative amounts of r-DMT and diacid component (if any is present in the polyester virgin feed stream) in the reaction mixture will impact the type, structure and total recycle content of the specific polyesters formed by the method of this disclosure.

In one or more embodiments, the step of adding a virgin feed to the reaction zone is initiated after the step of feeding to the reactor an ester recycle material. In one or more embodiments, the step of adding a virgin feed to the reaction zone and the step of feeding the recycle feed to the reaction zone are initiated concurrently or in the same physical location. Though the present disclosure is generally described above in terms of steps of feeding a recycle feed and in some embodiments feeding a virgin feed to a reaction zone to form a reaction mixture, it will be appreciated that the number and content of individual feed streams for the feed materials is not necessarily limited. By way of non-limiting example, the method may include combining a recycle feed and a virgin feed to form a combined recycle/virgin feed and feeding the combined recycle/virgin feed to the at least one reaction zone to form a reaction mixture.

In some typical TPA-based polyester manufacturing processes, the predominant acid component may be terephthalic acid, optionally with some amount of isophthalic acid lower than the terephthalic acid amount. Accordingly, in one or more embodiments, the virgin feed includes a virgin diacid component. In one or more embodiments, the virgin feed includes one or both of virgin terephthalic acid and virgin isophthalic acid. In one or more embodiments, a virgin diacid component of the virgin feed includes at least 90 mole % or at least 92 mole % or at least 94 mole % or at least 95 mole % or at least 96 mole % or at least 98 mole % virgin terephthalic acid based on the total moles of diacid in the virgin feed. In one or more embodiments, the virgin feed includes no more than 10 mole % or no more than 5 mole % virgin isophthalic acid based on the total moles of acid in the virgin feed. In one or more embodiments, a diacid component of the virgin feed includes 100 mole % terephthalic acid based on the total moles of acid in the virgin feed.

TPA-based polyester manufacturing processes may be utilized in producing copolyesters having two more diol residues. Accordingly, in one or more embodiments, the virgin feed includes one or more virgin diols. Suitable diols are well known in the art and include by way of non-limiting example, ethylene glycol, 1,3-propane diol, 1,4-butane diol, 1,5-pentane diol, 1,6-hexane diol, 1,7-heptane diol, 1,8-octane diol, 1,10-decane diol, diethylene glycol, triethylene glycol, polyethylene glycols, polytetrahydrofurans, poly-oxymethylenes, isosorbide, 1,3- and 1,4-cyclohexane dime-thanol (CHDM), 1,4-cyclohexane dimethanol, 2,2,4,4-tet-raalkylcyclobutane diols including 2,2,4,4-tetramethylcyclobutane diol (TMCD), neopentyl glycol, 2,2,4-trimethyl-1,3-pentane diol, glycerol, trimethylolpropane, pentaerylthritol, resorcinol, hydroquinone and catechol and isomers and combinations thereof. In one or more embodiments, a virgin diol component of the virgin feed includes one or more diols selected from the group consisting of ethylene glycol, diethylene glycol, neopentyl glycol, 2,2,4,4-tetramethyl-1,3-cyclobutanediol (TMCD), cyclohexanedi-methanol (CHDM) and isomers and combinations thereof.

The ester recycle material of the feeding step is selected from the group consisting of recycle dimethyl terephthalate (r-DMT), trans-esterified r-DMT and combinations thereof. Transesterified r-DMT, as used herein, is intended to include r-DMT that has been transesterified with one or more alcohols, for example glycols, such that the methyl ester functionalities of the r-DMT have been replaced with ester functionalities formed from the one or more alcohols. Accordingly, in one or more embodiments, the method of the present disclosure includes, prior to said feeding step, the step of pre-reacting at least some of the r-DMT with one or more alcohols to form a trans-esterified r-DMT. In one or more embodiments, the alcohols are diols selected from the group consisting of ethylene glycol, 1,3-propane diol, 1,4-butane diol, 1,5-pentane diol, 1,6-hexane diol, 1,7-heptane diol, 1,8-octane diol, 1,10-decane diol, diethylene glycol, triethylene glycol, polyethylene glycols, polytetrahydro-furans, polyoxymethylenes, isosorbide, 1,3- and 1,4-cyclo-hexane dimethanol (CHDM), 1,4-cyclohexane dimethanol, 2,2,4,4-tetraalkylcyclobutane diols including 2,2,4,4-tetram-ethylcyclobutane diol (TMCD), neopentyl glycol, 2,2,4-trimethyl-1,3-pentane diol, glycerol, trimethylolpropane, pentaerylthritol, resorcinol, hydroquinone and catechol and isomers and combinations thereof. In one or more embodi-ments, the alcohols are diols selected from the group con-sisting of ethylene glycol, diethylene glycol, neopentyl glycol, 2,2,4,4-Tetramethyl-1,3-cyclobutanediol, cyclo-hexanedimethanol, ethylene glycol, 2,2,4,4-tetramethyl-1,4-cyclobutanediol and isomers and combinations thereof. In one or more embodiments, pre-reacting step is performed in the presence of a metal-based catalyst. Non-limiting examples for the metal of the metal-based catalyst include Sb, Ti, Sn, Mo, Ge, Zn, Co, Mn, Cd, Al, Li, Pb, Mg, Ca, Ag, Na, Ce, Ba, Hg, Fe, Cu and combinations thereof. In one or more embodiments, the metal for the metal-based catalyst is selected from the group consisting of titanium, manganese and zinc and combinations thereof. In one or more embodi-ments, reaction conditions for the pre-reacting step would be selected to replace a majority (greater than 50 mole %) of the methyl ester functionalities of the recycled material with diol ester linkages, such as for example 2,2,4,4-tetramethyl-1,4-cyclobutanediol ester linkages, from the one or more glycols of the pre-reacting step. In one or more embodi-ments, the one or more glycol of the pre-reacting step includes 2,2,4,4-tetramethyl-1,4-cyclobutanediol and the catalyst is a tin catalyst.

One measure of the reactants in the reaction mixture is known as a "molar ratio", which is the ratio of the molar amount of diol in the reaction mixture to the molar amount of the sum of diacid+ester in the reaction mixture:

$$MR = Md/(Ma + Me)$$

wherein MR is the molar ratio, Md is moles diol in the reaction mixture, Ma is moles acid in the reaction mixture and Me is moles ester in the reaction mixture. In one or more embodiments, the molar ratio of the reaction mixture is 4 or less or 3 or less or 2.5 or less or 2 or less or 1.5 or less or 1 or less or from 1 to 6 or from 1.5 or 6 or from 2 to 6 or from 2.5 to 6 or from 1 to 4 or from 1.5 to 4 or from 2 to 4.

Applicants have unexpectedly discovered that a polyester with recycle content can be effectively and efficiently manufactured by a method wherein recycle monomer, in particular r-DMT, can be combined with other recycle or virgin materials and reacted to form a polyester with recycle content using process parameters, equipment, reaction conditions and the like more typical for a TPA-based manufacturing process. Accordingly, in one or more embodiments, the method of the present disclosure includes reacting the reaction mixture at a temperature of at least 250° C. or at least 260° C. or at least 270° C. or at least 275° C. for a total average residence time of between 30 minutes and 12 hours. In one or more embodiments, the method of the present disclosure includes reacting the reaction mixture at a temperature of at least 250° C. or at least 260° C. or at least 270° C. or at least 275° C. for a total average residence time of 4 hours or less, 3 hours or less, 2 hours or less or 1 hour or less.

While the method described herein with reference to a single (at least one) reaction zone in which an initial reaction mixture is formed, it will be appreciated that multiple reaction zones which may be in series, and/or multiple reactors which may be in series may be utilized. In one or more embodiments, a reactor may define one or more reaction zones while, in one or more embodiments, a reaction zone may include a one or a plurality of reactors. The number of reactors in a reaction zone may be 4 or less or 3 or less or 2 or less or 1 or less. Reaction zone is defined as a vessel (such as a CSTR or pipe reactor), an area or region wherein monomer reaction of methyl or acid ends with glycol occurs to esterify or transesterify the methyl or acid ends. Accordingly, the total average residence time for the reacting step is meant to include the sum total of the average residence times in all reaction zones and all reactors. The average residence time is termed as an "average" to reflect that the average residence time on a molecular basis is averaged over the total molecules in the reaction mixture. In one or more embodiments, the reacting step is performed in the presence of a metal-based catalyst. Non-limiting examples for the metal of the metal-based catalyst include Sb, Ti, Sn, Mo, Ge, Zn, Co, Mn, Cd, Al, Li, Pb, Mg, Ca, Ag, Na, Ce, Ba, Hg, Fe, Cu and combinations thereof. In one or more embodiments, the metal for the metal-based catalyst is selected from the group consisting of titanium, manganese, zinc and tin and combinations thereof. The amount of catalyst may vary depending on a number of factors such as reaction temperature. In one or more embodiments, the catalyst may be is present in an amount of 1 to 100 ppm or 1 to 50 ppm or 1 to 40 ppm or 1 to 30 ppm or 1 to 20 ppm or 1 to 15 ppm or 1 to 10 ppm to 1 to 5 ppm or from 1 to 4 ppm or from 1 to 3 ppm or from 1 to 2 ppm metal based on parts reaction mixture.

The reacting step of the method of the present disclosure includes reacting the reaction mixture to form a polyester oligomer mixture with recycled content. In one or more embodiments, the recycle content oligomer mixture has a degree of polymerization of from 1 to 30 or from 1 to 25 or from 1 to 20 or from 1 to 15. One of ordinary skill will be appreciate that, for embodiments that may include multiple reaction zones in series, the degree of polymerization may increase in successive zones.

In one or more embodiments, the method of the present disclosure may be performed as an aspect of a waste polyester recycling process. Accordingly, in one or more embodiments, the method of the present disclosure further includes, prior to the feeding step, the step of, the step of depolymerizing a waste polyester to form a depolymerization product comprising r-DMT. In one or more embodiments, the depolymerizing step forms a depolymerization product that includes r-EG. The depolymerizing step may form a depolymerization product stream that includes recycle dimethyl terephthalate (r-DMT) and optionally recycle ethylene glycol (r-EG). The phrase "waste polyester" as used herein is intended to include without limitation post-consumer polyester materials, post-industrial polyester materials, polyester scrap, polyester selvedge and off-spec and customer-returned polyester materials.

One or ordinary skill will appreciate that the depolymerization product stream may include a number of materials based in part on the specific composition of the waste polyester. Accordingly, in one or more embodiments, the depolymerizing step further includes separating r-DMT from a depolymerization product stream to form a r-DMT-rich stream.

Methods, techniques and systems for depolymerizing polyester are well known in the art. A particularly suitable method is methanolysis. Methanolysis depolymerization is well known in the art and is described previously herein and at least in those references previously incorporated herein by reference. Polyester recycling processes generally are described in U.S. Published Patent Application No. U.S. 2013/0041053, assigned to the assignee of the present disclosure, the contents and disclosure of which are incorporated herein by reference. The term "methanolysis" as used herein is intended to encompass so-called glycolysis methods which include a step of r-DMT formation via a methanolysis step.

The method of the present disclosure further includes polycondensing the recycle content oligomer mixture to form a polyester with recycle content. Polycondensation is a well-known step in polyester manufacture wherein esters and ester oligomers formed by direct esterification of diacids with diols and/or transesterification of esters are polymerized by condensation polymerization to form the polyester, typically with the elimination of any diol which is readily volatilized under the polycondensation conditions and removed from the system. The polycondensation may be performed under vacuum and at a temperature which generally ranges from about 230° C. to about 350° C., preferably about 250° C. to about 310° C. and most preferably about 260° C. to about 300° C. for about 0.1 to about 6 hours, or preferably, for about 0.2 to about 2 hours, until a polymer having the desired degree of polymerization, as determined by inherent viscosity, is obtained. The polymer may undergo further polymerization in the solid state.

As discussed above, the recycle feed for the feeding step of the method of the present disclosure may include, in addition to an ester recycle material selected from the group consisting of r-DMT, transesterified r-DMT and combinations thereof, additional components such as dimethyl isophthalate recycle material (r-DMI) and/or a residual catalyst material. Accordingly, in another aspect, the present disclosure is directed to a recycle feed composition for manufacture of polyesters with recycle content. The recycle feed composition of the present disclosure includes ester recycle material selected from the group consisting of r-DMT, transesterified r-DMT and combinations thereof; and at least one of dimethyl isophthalate recycle material (r-DMI) and residual catalyst material. In one or more embodiments, the recycle feed composition includes dimethyl isophthalate recycle material (r-DMI). In one or more embodiments, the recycle feed composition includes residual catalyst material. In one or more embodiments, the recycle feed composition includes dimethyl isophthalate recycle material (r-DMI) and residual catalyst material. In one or more embodiments, the recycle feed composition includes r-TPA, such as for example r-TPA formed by hydrolysis of r-DMT.

In one or embodiments, the residual catalyst material may be selected from the group consisting of germanium materials and antimony materials and combinations thereof. In one or embodiments, the r-DMI may be present in an amount of 3000 ppm or more or 2000 ppm or more or 1500 ppm or more or 1000 ppm or more based on parts recycle feed composition. In one or more embodiments, the residual catalyst material may be present in the amount of 5 to 500 ppm based on parts recycle feed composition.

Applicants have also surprisingly discovered that the methods of the present disclosure generate recycled content polyesters with unique and useful properties. Accordingly, in another aspect, the present disclosure is directed to polyesters with recycled content, or recycled content polyesters, wherein the number of carboxyl ends present in the recycled content polyester is less than 25 meq/kg polymer or less than 20 meq/kg polymer or less than 15 meq/kg polymer. "Carboxyl ends" refers to free carboxyl groups (—COON) present at the terminus of the polyester macromolecules. Carboxyl ends may be measured for example by acid-based titration with a dissolved polymer sample. In a suitable measurement technique, a weighed sample of polyester polymer is dissolved in hot ortho-cresol ($120°+/-5°$ C.), allowed to cool, and then diluted with methylene chloride with bromo-cresol green indicator solution. An automatic titrator optically determines the endpoint and calculates the results.

In another aspect, the present disclosure is directed to polyesters with recycled content, or recycled content polyesters, wherein the diethylene glycol content of the recycled content polyester is less 2.0% by weight or less than 1.8% by weight or less than 1.6% by weight or less than 1.5% by weight or less than 1.4% by weight or less than 1.2% by weight or less than 1.0% by weight or less than 0.8% by weight or less than 0.6% by weight, all based on the total weight of the polymer. "Diethylene glycol content" refers to amount of diethylene glycol [$(HOCH_2CH_2)_2O$] present in the recycled content polymer. In one or more embodiments, at least some of the diethylene glycol content is "in-situ" diethylene glycol content, meaning that the diethylene glycol used in forming the polymer is formed during the process of forming the polymer (in contrast to being formed separately and purposefully added during the process of forming of polymer). Diethylene glycol content may be measured for example by conventional GC techniques after hydrolyzing the polymer or proton NMR techniques.

The following examples further illustrate how the polyesters of the present disclosure can be made and evaluated, and they are intended to be purely exemplary and are not intended to limit the scope thereof. Unless indicated otherwise, parts are parts by weight, temperature is in degrees C. (Celsius) or is at room temperature, and pressure is at or near atmospheric.

This disclosure can be further illustrated by the following examples of preferred embodiments thereof, although it will be understood that these examples are included merely for purposes of illustration and are not intended to limit the scope of the disclosure unless otherwise specifically indicated.

EXAMPLES

Example 1—Oligomer Synthesis Section

The oligomers used to build up to high polymer were synthesized in a 2-gallon stainless steel autoclave with a partial condenser heated by hot oil. For the series of experiments shown table 1 the reaction process was as follows, raw materials were charged to the reactor and it was sealed and heated to $260°$ C. and pressurized to 30 psig, the partial condenser was heated to $130°$ C. and the reaction was run for 8 hours once the system was at temperature. The reactor was then heated to targeted composition for the final material was PET with 5% IPA modification and in all cases a titanium tetra-isopropoxide catalyst was added such that the content in the final polymer should be 15 ppm.

TABLE 1

| Sample | TPA (g) | IPA (g) | DMT (g) | EG (g) |
|---|---|---|---|---|
| 1 | 1894 | 99.7 | 0 | 1340.7 |
| 2 | 1420.5 | 99.7 | 553.4 | 1340.7 |
| 3 | 947 | 99.7 | 1106.9 | 1340.7 |
| 4 | 473.5 | 99.7 | 1660.3 | 1340.7 |
| 5 | 0 | 99.7 | 2213.8 | 1340.7 |

100 g of the oligomers were then loaded into a single neck 500 mL round bottom flask. The target level of antimony catalyst was added to the flask as an ethylene glycol solution. A stainless-steel stirring unit consisting of a ¼" diameter shaft attached to a single 2.5" diameter stir blade was inserted into the flask and then the flask was fitted with a glass polymer head. The polymer head consisting of a standard taper 24/40 male joint was connected to the reaction flask; a side arm positioned at approximately $45°$ to the neck of the flask to permit the removal of volatile materials and a section of glass tubing extending above the neck of the flask through which the stirring shaft was passed. The tubing section through which the stir shaft passes was fitted with a Teflon bushing and a rubber hose to provide a vacuum tight seal around the stir shaft. The shaft was turned by a ⅛ horsepower motor connected to it by a flexible "universal" joint. The side arm was connected to a vacuum system consisting of a dry ice cooled condenser and a vacuum pump. Pressure within the reaction flask was controlled by bleeding nitrogen into the vacuum stream. The reaction flask was heated using a molten metal bath. All reaction parameters were monitored and controlled using a distributed data acquisition and control system. Table 2 shows the reaction sequence used by the automated control system, the change in stage 8 was used to produce a lower viscosity material which was carried on through solid stating.

TABLE 2

| Reaction Stage Number | Duration of stage (minutes) | Temperature (° C.) | Pressure (mm Hg) | Stirring Rate (RPM shaft) |
|---|---|---|---|---|
| 1 | 0.1 | 265 | Atmospheric | 1 |
| 2 | 25 | 265 | Atmospheric | 125 |
| 3 | 5 | 265 | 130 | 150 |
| 4 | 30 | 265 | 130 | 150 |
| 5 | 10 | 280 | 4 | 125 |
| 6 | 40 | 280 | 4 | 125 |
| 7 | 5 | 280 | 1 | 75 |
| 8 | 90 (60) | 280 | 1 | 75 |
| 9 | 2 | 280 | Atmospheric | 0 |

Following polymerization, each polymer was removed from the blade of the stir shaft and ground in a hammer mill to a particle size sufficiently small to allow it to pass through a screen perforated with 6 mm holes. All testing and solid stating was done on the granules.

Table 3 below details examples of the final IV for materials produced with different amounts of DMT added into the TPA based process. In Table 2% DMT refers to the mol % in the reaction where a TPA unit is replaced with DMT. The inherent viscosity of the polyesters herein was determined in 60/40 (wt/wt) phenol/tetrachloroethane at a concentration of 0.5 g/dL at 25° C., and is reported in dL/g. The metals content of the material was determined by X-ray fluorescence in a method similar to ASTM D6247-18 (modified for sample matrix and analytes of interest). The use of and amount of DMT added to the system has no negative effect on the IV build of the material.

TABLE 3

| Sample | DMT % | Ti (ppm) | Sb (ppm) | IV |
|---|---|---|---|---|
| 1 | 0 | 11.6 | 165 | 0.7 |
| 2 | 25 | 14.4 | 203 | 0.82 |
| 3 | 50 | 12.4 | 194 | 0.81 |
| 4 | 75 | 13.8 | 202 | 0.76 |
| 5 | 100 | 14.3 | 190 | 0.86 |

A standard solid stating process (24 h hold at 220° C., 1 mmHg) was done to determine the effect DMT would have on the IV lift. The results shown in Table 4 demonstrate that as with the resin-based process there are no negative effects of adding the DMT to the PTA based process. This result is unexpected given the poor reactivity of any residual methyl ends in solid stating. Without being bound by any theory, it is believed that the high temperature and long residence time in the first reactor may have reduced the methyl end content to the point that it no longer hindered solid state IV build.

TABLE 4

| Sample | DMT % | IV (resin) | IV (solid stated) |
|---|---|---|---|
| 6 | 0 | 0.629 | 1.605 |
| 7 | 50 | 0.66 | 1.482 |
| 8 | 100 | 0.742 | 1.961 |

For avoidance of doubt, it is expressly provided for that the information and descriptions herein regarding features or elements of one aspect of the present disclosure are asserted as applicable to and relied on to also support those features and elements when described with regard to other aspects of this disclosure.

The foregoing description of various embodiments of this disclosure has been presented for purposes of illustration and description. It is not intended to be exhaustive or to limit this disclosure to the precise embodiments disclosed. Numerous modifications or variations are possible in light of the above teachings. The embodiments discussed were chosen and described to provide the best illustration of the principles of this disclosure and its practical application to thereby enable one of ordinary skill in the art to utilize this disclosure in various embodiments and with various modifications as are suited to the particular use contemplated. All such modifications and variations are within the scope of this disclosure as determined by the appended claims when interpreted in accordance with the breadth to which they are fairly, legally, and equitably entitled.

That which is claimed is:

1. A method for manufacture of polyesters with recycle content, said method comprising the steps of feeding to at least one reaction zone recycle feed comprising an ester recycle material selected from the group consisting of r-DMT, transesterified r-DMT and combinations thereof to form a reaction mixture comprising recycled content in said at least one reaction zone; reacting said reaction mixture to form a polyester oligomer mixture with recycled content; and polycondensing said recycle content oligomer mixture to form a polyester with recycle content; wherein said feeding step further comprises feeding to at least one reaction zone a virgin feed, said virgin feed including at least one virgin diol component, said virgin feed further comprises a virgin diacid component, and said virgin diacid component is at least 90 mole % terephthalic acid based on the total diacid content of said virgin feed; and wherein said reacting step comprises reacting said reaction mixture at a temperature of at least 250° C. for a total average residence time of between 30 minutes and 12 hours.

2. The method of claim 1 wherein said feeding step further comprises feeding to at least one reaction zone a diol recycle material selected from the group consisting of r-EG, r-DEG and combinations thereof.

3. The method of claim 1 wherein said recycle feed further comprises dimethyl isophthalate recycle material (r-DMI).

4. The method of claim 1 wherein said recycle feed further comprises residual catalyst material selected from the group consisting of germanium materials and antimony materials and combinations thereof.

5. The method of claim 1 wherein said virgin diacid component comprises one or both of terephthalic acid and isophthalic acid.

6. The method of claim 1 wherein reacting step is performed in the presence of a metal-based catalyst with the metal of said metal-based catalyst selected from the group consisting of Sb, Ti, Sn, Mo, Ge, Zn, Co, Mn, Cd, Al, Li, Pb, Mg, Ca, Ag, Na, Ce, Ba, Hg, Fe, Cu and combinations thereof.

7. The method of claim 1 wherein said virgin diol component of said virgin feed includes one or more of ethylene glycol, 1,3-propane diol, 1,4-butane diol, 1,5-pentane diol, 1,6-hexane diol, 1,7-heptane diol, 1,8-octane diol, 1,10-decane diol, diethylene glycol, triethylene glycol, polyethylene glycols, polytetrahydrofurans, polyoxymethylenes, isosorbide, 1,3- and 1,4-cyclohexane dimethanol (CHDM), 1,4-cyclohexane dimethanol, 2,2,4,4-tetraalkylcyclobutane diols including 2,2,4,4-tetramethylcyclobutane diol (TMCD), neopentyl glycol, 2,2,4-trimethyl-1,3-pentane diol, glycerol, trimethylolpropane, pentaerylthritol, resorcinol, hydroquinone and catechol and isomers and combinations thereof.

8. The method of claim 1 wherein said diol component of said virgin feed includes one or more diols selected from the group consisting of ethylene glycol, diethylene glycol, neopentyl glycol, 2,2,4,4-tetramethyl-1,3-cyclobutanediol (TMCD), cyclohexanedimethanol (CHDM) and isomers and combinations thereof.

9. The method of claim 1 further comprising, prior to said feeding step, the step of depolymerizing a waste polyester to form a depolymerization product comprising r-DMT; and wherein said depolymerization step is performed by methanolysis.

10. The method of claim 1 wherein said ester recycle material of said feeding step is fed in an amount sufficient to account for 1 to 100 mole % based on total moles diacid of 1,4-dicarboxybenzene equivalents in said polyester with recycled content.

11. The method of claim 1 wherein said step of feeding said virgin feed precedes said step of feeding said recycle feed; and wherein said method further includes the step of reacting at least some of said virgin feed in said reactor to form virgin polyester oligomer prior to or concurrent with the step of feeding said recycle feed.

12. The method of claim 1 further comprising, prior to said feeding step, the step of pre-reacting at least some of said r-DMT with one or more diols selected from the group consisting of diols selected from the group consisting of ethylene glycol, diethylene glycol, neopentyl glycol, 2,2,4, 4-tetramethyl-1,3-cyclobutanediol, cyclohexanedimethanol, ethylene glycol, 2,2,4,4-tetramethyl-1,4-cyclobutanediol and isomers and combinations thereof to form a trans- esterified r-DMT.

13. The method of claim 12 wherein said pre-reacting step is performed in the presence of a metal-based catalyst with the metal of said metal-based catalyst selected from the group consisting of Sb, Ti, Sn, Mo, Ge, Zn, Co, Mn, Cd, Al, Li, Pb, Mg, Ca, Ag, Na, Ce, Ba, Hg, Fe, Cu and combina- tions thereof.

14. A recycle feed composition for manufacture of poly- esters with recycle content, said recycle feed comprising:

ester recycle material selected from the group consisting of r-DMT, transesterified r-DMT and combinations thereof; r-TPA and at least one of dimethyl isophthalate recycle material (r-DMI); and residual catalyst material selected from the group con- sisting of germanium materials and antimony mate- rials and combinations thereof.

15. The recycle feed composition of claim 14 wherein said recycle feed composition comprises dimethyl isophtha- late recycle material (r-DMI) in an amount of 3000 ppm or more; or wherein said residual catalyst material is present in the amount of 5 to 500 ppm based on part of said feed composition.

* * * * *